US012065078B2

(12) United States Patent
Toyooka

(10) Patent No.: US 12,065,078 B2
(45) Date of Patent: Aug. 20, 2024

(54) REFLECTIVE BACKLIT DISPLAY WITH A LIQUID CRYSTAL CELL

(71) Applicant: 3M INNOVATIVE PROPERTIES COMPANY, St. Paul, MN (US)

(72) Inventor: Kazuhiko Toyooka, Yamagata Prefecture (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 871 days.

(21) Appl. No.: 16/063,121

(22) PCT Filed: Dec. 6, 2016

(86) PCT No.: PCT/US2016/065183
§ 371 (c)(1),
(2) Date: Jun. 15, 2018

(87) PCT Pub. No.: WO2017/105926
PCT Pub. Date: Jun. 22, 2017

(65) Prior Publication Data
US 2020/0262351 A1 Aug. 20, 2020

Related U.S. Application Data

(60) Provisional application No. 62/268,908, filed on Dec. 17, 2015.

(51) Int. Cl.
*B60R 1/12* (2006.01)
*F21V 8/00* (2006.01)
*G02F 1/1335* (2006.01)

(52) U.S. Cl.
CPC .............. *B60R 1/12* (2013.01); *G02B 6/0055* (2013.01); *G02F 1/133536* (2013.01);
(Continued)

(58) Field of Classification Search
CPC .................... G02F 1/1335; G02F 1/133615
See application file for complete search history.

(56) References Cited

U.S. PATENT DOCUMENTS 6,271,901 B1 * 8/2001 Ide .................... G02F 1/133536
349/96
6,577,361 B1 6/2003 Sekiguchi et al.
(Continued)

FOREIGN PATENT DOCUMENTS

EP 0376207 1/2004
JP 11248938 A2 9/1999
(Continued)

OTHER PUBLICATIONS

Merriam-webster/dictionary/disposed (accessed Jan. 23, 2024).*
(Continued)

*Primary Examiner* — Lauren Nguyen
(74) *Attorney, Agent, or Firm* — Jonathan L. Tolstedt

(57) ABSTRACT

Mirrors including reflective backlit displays are described. In particular, mirrors including backlit displays with a backlight, a liquid crystal cell including a liquid crystal layer disposed between two opposing transparent substrate layers, a first reflective polarizer, and a second reflective polarizer are described. The first and second reflective polarizers are each directly laminated to one of the opposing transparent substrate layers. Mirrors described herein may be configured as vehicle rear-view mirrors.

11 Claims, 2 Drawing Sheets

(52) U.S. Cl.
CPC .................. *B60R 2001/1215* (2013.01); *G02F 1/133562* (2021.01); *G02F 1/133567* (2021.01)

(56) References Cited

U.S. PATENT DOCUMENTS

| | | | |
|---|---|---|---|
| 6,822,711 | B1 | 11/2004 | Yoshida |
| 7,221,363 | B2 | 5/2007 | Roberts |
| 7,903,335 | B2 | 3/2011 | Nieuwkerk |
| 8,237,909 | B2 | 8/2012 | Ostreko |
| 8,339,526 | B2 | 12/2012 | Minikey, Jr. |
| 2003/0043480 | A1 | 3/2003 | Burgner |
| 2004/0246407 | A1 | 12/2004 | Tanaka et al. |
| 2006/0007550 | A1 | 1/2006 | Tonar |
| 2008/0068520 | A1 | 3/2008 | Minikey, Jr. |
| 2008/0151147 | A1 | 6/2008 | Weber |
| 2008/0186428 | A1* | 8/2008 | Sakamoto ......... G02F 1/133617 349/62 |
| 2009/0002576 | A1 | 1/2009 | Suzuki et al. |
| 2009/0128909 | A1* | 5/2009 | Miller .................. G02B 27/283 359/489.19 |
| 2010/0020272 | A1 | 1/2010 | Kim et al. |
| 2010/0245701 | A1 | 9/2010 | Sato et al. |
| 2014/0098330 | A1 | 4/2014 | Nam |
| 2014/0340728 | A1* | 11/2014 | Taheri ............... G02F 1/133536 359/250 |

FOREIGN PATENT DOCUMENTS

| | | |
|---|---|---|
| JP | 2004170793 A2 | 6/2004 |
| JP | 2010-079087 | 4/2010 |
| JP | 2014-026058 | 2/2014 |
| JP | 201426058 A2 | 2/2014 |
| JP | 2014-041274 | 3/2014 |
| WO | 1997001789 A2 | 1/1997 |
| WO | WO 1997/01789 | 1/1997 |
| WO | WO 03-079318 | 9/2003 |

OTHER PUBLICATIONS

Merriam-webster/dictionary/on (accessed Jan. 23, 2024).*
"Indoor Equipment", Nissan, DAYZ, [online], [retrieved from the internet on Aug. 14, 2018], URL http://www.nissan.co.jp/DAYZ/equip_avm.html, 12 Pages.
International Search Report for PCT International Application No. PCT/US2016/065183, mailed on Mar. 20, 2017, 5pgs.

* cited by examiner

REFLECTIVE BACKLIT DISPLAY WITH A LIQUID CRYSTAL CELL

BACKGROUND

Mirrors are used for many purposes, including for safety, aesthetics, and sartorial functions. Mirrors are commonly used in vehicles to view ambient road and traffic conditions generally behind the vehicle without needing to turn the head. Backlit displays utilize a spatial light modulator to selectively transmit and absorb light. Backlit displays may display in color or in monochrome.

SUMMARY

In one aspect, the present description relates to reflective backlit displays. In particular, the present description relates to reflective backlit displays including a backlight, a liquid crystal cell including a liquid crystal layer disposed between two opposing transparent substrate layers, a first reflective polarizer, and a second reflective polarizer. The first and second reflective polarizers are each directly adjacent to one of the opposing transparent substrate layers.

DETAILED DESCRIPTION

Rear view mirrors in vehicles, and in particular center (or inside) rear view mirrors may include display elements in order to provide navigational, status, safety, or other information to a driver. The inclusion of this information in a center rear view mirror may be particularly useful because a driver can glance at such information without losing sight of the road and traffic in front of the vehicle. Further, a driver routinely scans the mirrors instinctively, and so important information displayed on the mirror will be reliably seen by the driver without having to get accustomed to looking in a new or unusual location.

Conventional center rear view mirror displays adapt a conventional display stack by simply adding a vapor coated mirror (sometimes described as a half- or partial-mirror or reflector) on the front of the display. Such an adaptation reflects some portion of the ambient light, creating a mirror-like appearance, but also reflects the same portion of the light from the convention display stack back away from the emission surface (the viewing surface) of the rear view mirror because the vapor coated mirror is a non-polarization-dependent reflector. This reflection loss is on top of the conventional losses in a display stack: from both the front and back absorbing polarizers and also the liquid crystal layer. Having the mirror-like appearance allows for the full surface of the mirror to be useful or viewable when the display is not displaying information. Further, the mirror-like appearance may be aesthetically preferable by having uniformly appearing rear view mirror.

By replacing at least the front absorbing polarizer with a reflective polarizer, and in some embodiments both the front and the back absorbing polarizer with two reflective polarizers, the display stack can incorporate the ambient light reflection functionality of a partial mirror without the need for additional layers. Further, the replacement of at least one absorbing polarizer with reflective polarizers eliminates at least some of the absorbing elements from the stack. These modifications may provide for a reflective backlight display with higher brightness and efficiency than a reflective back-light using a conventional display stack.

Figure 1:
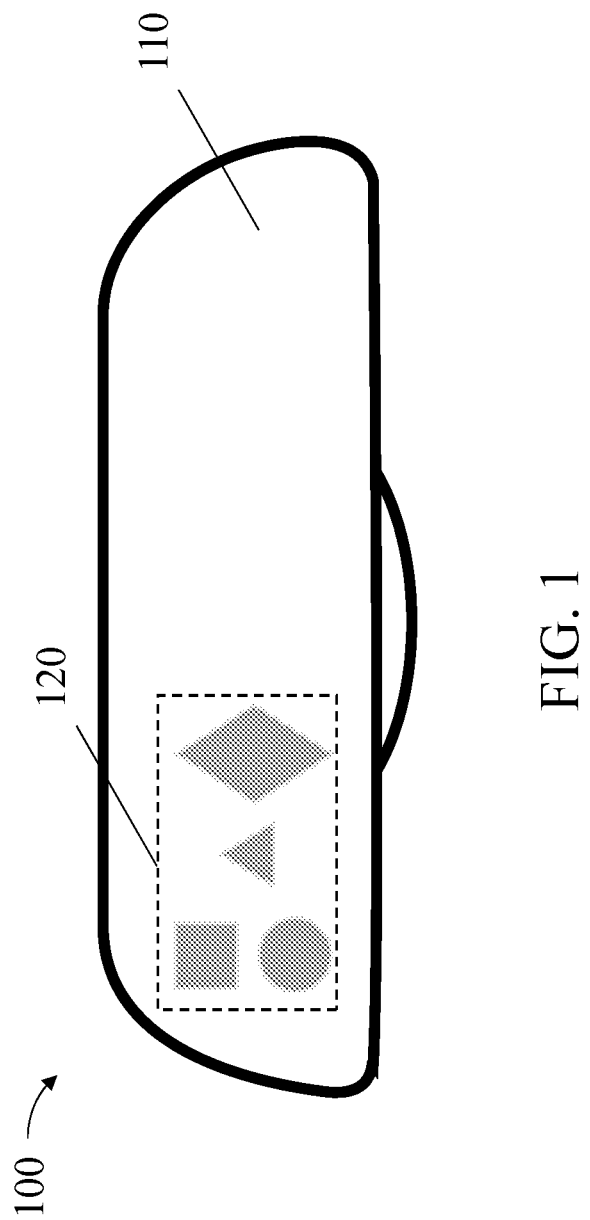
FIG. 1 is a front elevation view of a rear-view mirror including a reflective backlit display.

FIG. 1 is a front elevation view of a rear-view mirror including a reflective backlit display. Rear-view mirror 100 includes mirror portion 110 and reflective backlit display portion 120 displaying information. Mirror portion 110 and reflective backlit display portion 120 may have similar appearances. However, reflective backlit display portion 120 may be capable of directly displaying generated information or images, while mirror 110 is not. In some embodiments, mirror portion 110 may be a small portion of rear-view mirror 100, such as 40%, 30%, or 20% of the surface area. In some embodiments, mirror portion 110 may be a larger part of rear-view mirror 100, such as 50%, 60%, 70%, 80%, 90% or more. In some embodiments, the mirror portion may be between 50% and 90% of the rear-view mirror. In some embodiments, the display portion may be 100% of the mirror portion; in other words, the mirror portion and the display portion may be the same and fill the entire reflective surface of the rear-view mirror. Rear-view mirror 100 may include other elements, controls, or indicators on the border of the mirror or on attached parts.

Figure 2:
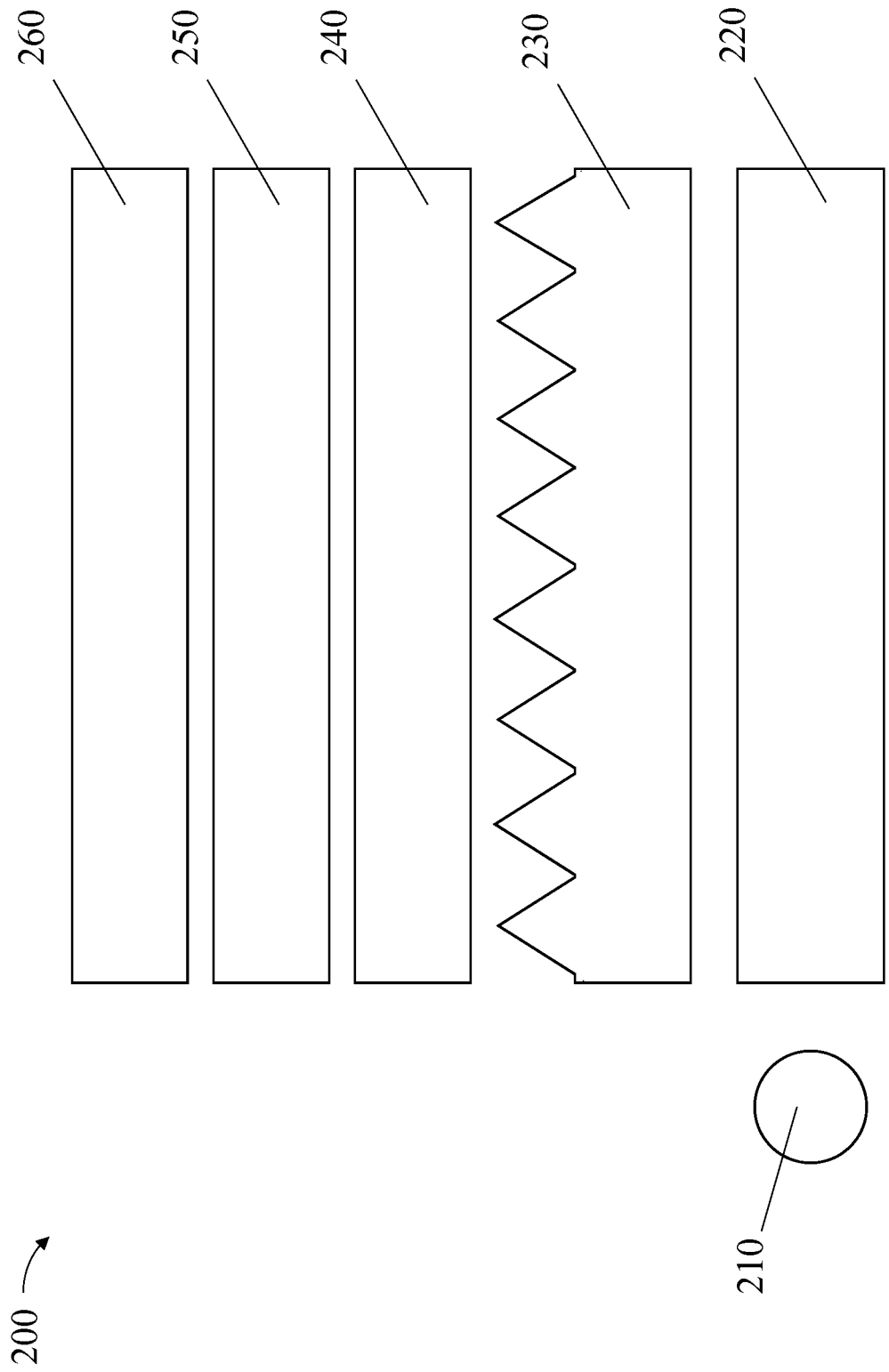
FIG. 2 is a side elevation view of a reflective backlit display stack.

FIG. 2 is a side elevation view of a reflective backlit display stack. Reflective backlit display stack 200 includes light source 210, lightguide 220, prism film 230, first reflective polarizer 240, liquid crystal cell 250, and second reflective polarizer 260.

Light source 210 may be any suitable light source or combination of light sources. Conventional light sources such as light emitting diodes (LEDs), cold cathode fluorescent lamps (CCFLs), and even incandescent bulbs may be used. In some embodiments, although each light source 210 is depicted as a single object in FIG. 2, combinations of LEDs (for example) may be used to provide a sufficiently white input light, but, depending on the application, any suitable spectrum or combination of spectra may be utilized. Light source 210 may include suitable injection or collimation optics to aid in coupling light into the structured lightguide or to help shape the light input for the structured lightguide. Light source 210 is disposed on either or both sides of the lightguide. Light source 210 on either side may be the same or similar light sources, or they may be different.

Lightguide 220 may be any suitable size and shape, and may be formed from any suitable material by any suitable process. For example, lightguide 220 may be acrylic or polycarbonate. Lightguide 120 may be formed from a process such as injection molding. Lightguide 120 has at least one input edge. The input edge is typically disposed on the surface of the lightguide closest to the light source(s). The input edge may have any suitable shape or structure, including structures to improve coupling of light from the light source into the structured lightguide. Lightguide 220 also has one or more features for extracting light. These extraction features may be arranged in any suitable configuration, including a periodic pattern, a non-periodic pattern, or a gradient. The extraction features may be arranged in a pattern that increases the areal uniformity of light output from lightguide 220.

Prism film 230 is optional in constructions described herein but may increase the overall on-axis brightness through light recycling. In this case, a reflector (not shown) may be used to redirect once again toward the front of reflective backlit stack 200 light that was reflected back from prism film 230 through total internal reflection at the interface between the prism film facets and air. The reflector may be coated on to lightguide 220 or may not be present, where the reflective backlit stack simply relies on Fresnel reflections off the interfaces of the prism films and lightguides. In some embodiments, the reflector is a multilayer optical film, such as Enhanced Specular Reflector (ESR) (available from 3M Company, St. Paul, Minn.).

Prism film 230 has a plurality of prisms extending in a same first direction. In some embodiments, prism film 230 may instead have multiple films, with at least one film having prisms extending in a first direction and at least one film having prisms extending in a second direction orthogonal to the first direction. For multiple prism films, they may be laminated to one another or may simply rest on one another. The prism films may be formed by any suitable process, including microreplication, for example through a continuous-cast-and-cure process or the like.

The prisms of prism film 230 may have any suitable geometry, including included angle, base angle, height, pitch, width, and rotation—and one or more of these parameters may vary either along a prism or across prisms. Prism film 230 may be, for example, Brightness Enhancing Film (BEF) (available from 3M Company, St. Paul, Minn.).

First reflective polarizer 240 and second reflective polarizer 260 are disposed on either side of liquid crystal layer 250. Liquid crystal cell 250 typically includes a layer of liquid crystal sandwiched by two layers of glass or another transparent substrate. The reflective polarizers may both be adjacent to the transparent substrate or one or both may be laminated directly to the glass or transparent substrate of the liquid crystal cell. The lamination may be performed using. Alternatively, only one or even neither of the reflective polarizers may be laminated directly to the glass or transparent substrate of the liquid crystal cell.

First reflective polarizer 240 may be any suitable reflective type polarizer. In some embodiments, the reflective polarizer may be an oriented multilayer polymeric optical film, such as DBEF or APF reflective polarizers (available from 3M Company, St. Paul, Minn.) In some embodiments, the reflective polarizer may be a wire-grid or cholesteric reflective polarizer. In some of these embodiments, the reflective polarizer may include one or more retardation or compensation layers, such as a quarter-wave plate, to convert between linear polarizations and circular or elliptical polarizations. First reflective polarizer 240 may have any suitable thickness; in the case of a multilayer optical film, the reflective polarizer may be a thicker multi-packet or laminated construction or a relatively thinner single packet construction. Second reflective polarizer 260 may be identical to first reflective polarizer 240 or they may be similar. In some embodiments, first reflective polarizer 240 and second reflective polarizer 260 may have some or many different characteristics. In some embodiments, an additional reflective polarizer or reflective polarizers may be disposed on either or both of the first and second reflective polarizers. In other words, there may be two or more reflective polarizers on each side of the First reflective polarizer 240 and second reflective polarizer 260 are configured to allow liquid crystal cell 250 to operate by selectively gating light. Depending on the type of liquid crystal material used in liquid crystal cell 250 (e.g., twisted nematic, super twisted nematic, etc.) and how the liquid crystal cell is electrically driven, the pass axes of the reflective polarizers should be configured such that for a pixel in an "on" state—i.e., in a state where a voltage differential is generated across a pixel of the liquid crystal cell, the light from the light source either substantially passes through the second reflective polarizer or it is substantially not transmitted through the second reflective polarizer, and for a pixel in an "off" state—i.e., in a state where there is no voltage differential across the pixel of the liquid crystal cell, the light from the light source is treated oppositely. Intermediate states are possible for certain types of liquid crystal cells. This may be a parallel arrangement of the pass axes of the reflective polarizers in some embodiments, or an orthogonal arrangement of the pass axes of the reflective polarizers. Any suitable driving electronics, conductive layers, or thin film transistors (TFTs) may be included or integrated into or included with liquid crystal cell 250.

Example

The liquid crystal display for a SONY VAIO PCG-572N (available from Sony Corp., Tokyo, Japan) notebook computer was modified by removing, on one half only, the absorbing polarizers laminated to either side of the glass of the liquid crystal cell. After removing the absorbing polarizers on half of the display, the absorbing polarizers were replaced by laminating 3M APF-T35 reflective polarizers (available from 3M Company, St. Paul, Minn.) to the glass. The liquid crystal display was replaced and observed in both an "ON" (displaying an image) and "OFF" (displaying no image) state. The modified portion of the liquid crystal display functioned as a reflective backlit display, functioning as a mirror when the display was OFF and showing a viewable image when the display was ON.

Performance was acceptable when compared to the reference half of the display, especially considering the reference display would further require a vapor-coated partial mirror to function as a reflective backlit display.

The following are exemplary embodiments according to the present disclosure:

Item 1. A reflective backlit display, comprising:
   a backlight;
   a liquid crystal cell including a liquid crystal layer disposed between two opposing transparent substrate layers;
   a first reflective polarizer; and
   a second reflective polarizer;
   wherein the first and second reflective polarizers are each directly adjacent to one of the opposing transparent substrate layers.

Item 2. The reflective backlit display of item 1, wherein at least one of the first or second reflective polarizers is a multilayer reflective polarizer.

Item 3. The reflective backlit display of item 1, wherein each of the first or second reflective polarizers is a multilayer reflective polarizer.

Item 4. The reflective backlit display of item 3, wherein the two transparent substrate layers are glass.

Item 5. The reflective backlit display of item 1, wherein the first and second reflective polarizers are each directly laminated to one of the opposing transparent substrate layers.

Item 6. The reflective backlit display of item 1, wherein the backlight includes a lightguide, a reflector disposed on the light guide, and a light source configured to inject light into the lightguide.

Item 7. The reflective backlit display of item 1, further comprising a third reflective polarizer, wherein the third reflective polarizer is disposed on either the first or the second reflective polarizer.

Item 8. A mirror, comprising:
a mirror portion; and
a reflective backlit display portion comprising the reflective backlit display of item 1;
wherein the reflective backlit display is capable of directly displaying images, and the mirror portion is not.

Item 9. A vehicle, comprising the mirror of item 8, the mirror being configured as a rear-view mirror.

Item 10. The mirror of item 9, wherein the reflective backlit display portion is greater than 10% but less than 50% of an area of the mirror.

Item 11. The reflective backlit display of item 1, wherein the reflective backlit display includes no absorbing polarizers.

Item 12. The reflective backlit display of item 1, wherein the reflective backlit display includes no non-polarization-dependent partial reflector.

What is claimed is:

1. A reflective backlit display, comprising:
a liquid crystal cell configured to display an image by controlling a state of one or more pixels, including a liquid crystal layer comprising the one or more pixels disposed between two opposing transparent substrate layers;
a first reflective polarizer;
a second reflective polarizer;
a third reflective polarizer, and
a backlight;
wherein the first and second reflective polarizers are each directly adjacent to one of the opposing transparent substrate layers, the third reflective polarizer is disposed on either the first or the second reflective polarizer, and the backlight is disposed such that light passes first through the first reflective polarizer before passing through the one or more pixels of the liquid crystal cell and the second reflective polarizer to form an image.

2. The reflective backlit display of claim 1, wherein at least one of the first or second reflective polarizers is a multilayer reflective polarizer.

3. The reflective backlit display of claim 1, wherein each of the first or second reflective polarizers is a multilayer reflective polarizer.

4. The reflective backlit display of claim 3, wherein the two transparent substrate layers are glass.

5. The reflective backlit display of claim 1, wherein the first and second reflective polarizers are each directly laminated to one of the opposing transparent substrate layers.

6. The reflective backlit display of claim 1, wherein the backlight includes a lightguide, a reflector disposed on the light guide, and a light source configured to inject light into the lightguide.

7. A mirror, comprising:
a mirror portion; and
a reflective backlit display portion comprising the reflective backlit display of claim 1;
wherein the reflective backlit display is capable of directly displaying images, and the mirror portion is not.

8. A vehicle, comprising the mirror of claim 7, the mirror being configured as a rear-view mirror.

9. The mirror of claim 8, wherein the reflective backlit display portion is greater than 10% but less than 50% of an area of the mirror.

10. The reflective backlit display of claim 1, wherein the reflective backlit display includes no absorbing polarizers.

11. The reflective backlit display of claim 1, wherein the reflective backlit display includes no non-polarization-dependent partial reflector.

* * * * *